Reissued Feb. 23, 1932 Re. 18,364

UNITED STATES PATENT OFFICE

HENRI LOUIS PAUL TIVAL, OF MONTEGNAC, FRANCE, ASSIGNOR, BY MESNE ASSIGNMENTS, TO FROSTED FOODS COMPANY, OF DOVER, DELAWARE, A CORPORATION OF DELAWARE

METHOD OF PREPARING PRODUCTS OF ORGANIC ORIGIN

No Drawing. Original No. 1,630,985, dated May 31, 1927, Serial No. 556,305, filed April 24, 1922. Application for reissue filed May 27, 1929. Serial No. 366,513.

This invention relates to novel methods for preparing products such as powders, juices, extracts and active principles of organic origin.

The products derived from organic substances, and particularly from fresh organic substances, differ in their action according as the product is brought through in a fresh or a dried state. This difference, especially in the case of medicinal or alimentary products, arises from the fact that the active or nutritive principles are associated, in the living organism, with other chemical compounds with which they form complex combinations, the molecular constitution of which differ from that of its components. Now it is known that the physiological action of a medicament is a function of its molecular structure, and that any disarrangement of the molecules will involve changes and modifications in the therapeutical effect of such substances. These complex combinations partially or entirely disappear in the dried organisms or under the influence of ferments or in the course of the various manipulative treatments to which the substances may be subjected, such as pulping, desiccation, decoction, filtration, etc., and also under the action of various physical and chemical agencies, such as heat, solvents and antiseptics.

It is for this reason that attempts have been made, in the case of vegetable substances, to destroy the ferments contained therein either by immersing the substances in boiling alcohol or by treating them while in a fresh state in an autoclave with alcohol vapor or steam.

These processes, known as "sterilization" or "stabilization", are not entirely satisfactory. In the first place, they are uncertain because the influence of temperature on ferments is of a complex character and its destructive action varies considerably according to the nature of the ferments, the conditions of the medium and the time factor. It cannot be said that any temperature is completely effective. On the other hand, the use of heat is objectionable in many cases as it acts both on the ferments and upon those other portions of the organic substances which should be protected. Moreover, the sterilizing action is not uniform throughout the mass of organic substances. Consequently, the removal or destruction of ferments is impractical by the use of heat and there is, moreover, a serious danger of damaging or impairing the organic substance by the desiccation resulting from the use of heat.

My invention is designed to bring fresh organic matter, either for foodstuffs or for medicaments, into a suitable form tc facilitate its preservation or consumption, by a novel method by which the difficulties above discussed are avoided. Organic substances vary to such an extent in volume, consistency and texture that their treatment entails the use of numerous and varied appliances, experienced handling and protracted treatments. Moreover, in certain cases such materials require treatment with aseptic precautions which it is practically impossible to carry out owing to the risk of bacterial contamination, which increases in proportion to the number of operations involved.

Furthermore, by reason of the sensitiveness and fragility of the complex organic combinations, the importance of the changes which the fresh substances may undergo and the ease with which they are contaminated by bacterial agents, it is necessary to adopt a simple and appropriate method of procedure in which the number of operations is reduced to a minimum.

The method of my invention is first characterized by reducing the organic substance to powder, which has the advantage of enabling one to present the product in small quantities and in an extremely fine state of subdivision. In this way, the manipulation of the product is facilitated, the desiccation thereof is accelerated, the extraction of the juices and extracts is improved, the assimilation is promoted, and the activity of the product increased. Since the pulverulent form serves as the basis of most of the applications of the product, i. e., for infusions, digestions, tinctures, alcoholates, extracts, etc., it follows that the therapeutical or alimentary value of a preparation will depend on that of the powder from which it has been prepared.

The pulverulent form also produces the most decided nutritive and curative results, experience having shown that it is in the interest of the internal economy that the active principles in which the organism is deficient should be restored thereto in the complex form in which they exist in nature, and that the pulverulent form is one advantageous condition in which the associated active principles may be conserved.

The main object of the present invention is to make available novel methods of preparation by following which the difficulties above discussed may be overcome and a final product derived which will represent as closely as possible the fresh organic substance as it was in the living state. My invention also contemplates methods by which an extract or an active principle may be derived from fresh organic substance in a condition approximating its natural state.

In one aspect, my invention is characterized by first pulverizing, then sterilizing, and finally drying the organic substance instead of first sterilizing, then drying, and finally pulverizing it, as has been the usual practice. The method of my invention may be successfully practiced by first subjecting the fresh organic substance to a temperature appreciably below its freezing point with an intensity sufficient to bring it, so to speak, instantaneously into a condition of hardness and rigidity favorable to pulverization without the intervention of chemical or fermentative reactions. The next step is to subject the frozen powdered substances while still subjected to low temperature to rays which will destroy microbes and ferments, and finally the frozen powder may be either dried and used in that form or, without being dried, the active principles it contains may be extracted, by means of solvents, and the said active principles may then be recovered by decanting or evaporating the solvent.

My invention further contemplates certain other steps which are preferably carried out concurrently and will be more fully described hereinafter. For example, in some cases it may be advantageous to destroy the microbes and ferments by subjecting the pulverized substance, while still under the influence of low temperature, to the action of an oscillating electrical field of suitable frequency, this being effected either in place of, or simultaneously with, the use of the bactericidal rays.

The invention will be best understood and appreciated from the following description of one example of the manner in which it may be practiced.

Let it be assumed, for example, that it is desired to obtain from any material of organic origin, a powder which will represent as closely as possible the original fresh material with all its natural juices, savory substances and vitamin content. In such case the method of procedure will be substantially as follows.

In the first place, the fresh material to be treated is subjected to a very low temperature, more extreme than that which has been ordinarily employed for the preservation of plants, treatment of fatty substances, concentration of saline solutions, calf liver, hawthorn flowers, etc. This may be effected, for example, by immersing the material in a liquefied gas or exposing it to an atomized spray of liquid gas, or by any other means suitable to produce the extreme temperature difference required. The material at once becomes hard and friable, so that it can be reduced to powder by any suitable mechanical means. The living organism, by this freezing step, is rendered inert, stabilized in its original condition, and any ferments and microbes it may contain pass into a condition of suspended vitality.

Freezing with the intensity and rapidity contemplated by my invention is known as "quick freezing" and may be defined as a freezing operation which takes place with sufficient rapidity as to avoid deterioration of the structure of the matter and in which the cells of the product are not disrupted and in which the frozen substance, throughout its mass, retains its natural qualities substantially unimpaired.

In those cases where it is desired to sterilize or substantially sterilize the product, that result may be now effected by utilizing the bactericidal properties of certain rays, for example, those of the spectrum, of relatively short wave-length which belong to the most refractable area of the spectrum and are recognized—at least in the present state of knowledge—as being the most powerful bactericides. After being freed, by suitable filtration, of such rays as might have an adverse effect on the substance, these bactericidal rays are allowed to act on the frozen powder—or during its preparation—while the same is still subjected to a low temperature.

As an alternative step, the destruction of microbes and ferments may be effected by causing an oscillating electrical field of suitable frequency to act either in place of or concurrently with the bactericidal rays on the pulverized substances while still subjected to low temperature.

Finally, the frozen powdered material, after being thus sterilized, is dried and this may be effected by any suitable means such, for example, as in autoclaves in which a high vacuum and a temperature below zero can be produced. If the active principles or juices, which in this case would be in the form of an oil, are to be extracted from the frozen powdered material, this may be effected by utilizing the solvent properties of certain liquefied gases, such as certain neutral hydrocarbons; for example methane. The solvent is preferably brought into close contact with the powder in a closed vessel under pressure. and in this way macerations or lixiviations are obtained. After being left to settle, the dissolved matter floating upon the compound or emulsion is collected, by decantation, into suitable vessels and the oil recovered after evaporation.

While I have specifically described my invention as applied to the treatment of fresh material of organic origin in producing a powder therefrom and also an oil, it will be understood that the invention is not limited in its application to any particular material and I have particularly in mind its use in connection with the preservation of plants and the treatment of fatty substances in general. The method of dissolving out the active principles is particularly suitable for use in connection with aromatic plants in order to recover therefrom the essential oils and in order to separate them from the terpene products by fractional distillation at low temperature.

The reason for not subjecting the organic substances to the ordinary degree of low temperature employed heretofore is that such cold produces exosmotic phenomena concurrently with desiccation. The freezing of the tissues produces organic disturbances, such as the bursting of the cells and cellular dehydration, which facilitate chemical reactions by bringing the ferments and fermentable substances into mutual contact.

The phenomenon is entirely different with the low temperatures mentioned above. In fact, if an organism—for example, a plant—is plunged into a liquefied gas, freezing takes place so quickly that the substance is fixed in its natural state and, so to speak, stabilized and immobilized in its function of active existence. The sudden or quick freezing does not allow the water content of the substance sufficient time either to diffuse through the membrane or to pass through the stage of maximum volume. The tissues remain intact, and there is no atmolysis or plasmolysis. Fermentative life is suspended and the plant is brought into a condition in which it can be very easily reduced to powder without intervening fermentation.

From an industrial standpoint, the method of my invention is advantageous in that it may be applied to any living organic substance taken in the fresh condition. It involves only simple operations of a small number and requires equipment and plant of moderate size and standard equipment.

From the pharmacological and hygienic standpoint, my invention reduces the risk of change and guarantees stringent asepsy in the product. Further, my invention not only makes it unnecessary to employ injurious physical agents and to carry out mechanical operations which are liable to set up changes in the product, but also utilizes an agent which preserves the natural integrity of the fresh organic substance. I thus obtain a stable final product having the maximum therapeutic and neutritive properties possessed by the organic substance in its fresh state, which product will keep for practically any length of time without alteration.

As already stated, the invention is by no means restricted to the particular mode of application or embodiments that have been particularly specified but extends to all modifications of the same coming within the scope of the appended claims.

What I claim and desire to protect by Letters Patent is:

1. A method for treatment of organic matter to preserve the principal ingredients thereof when said matter is desiccated, which consists in first quick-freezing the organic matter, pulverizing it while it is maintained in a frozen condition, sterilizing the frozen powder, and finally drying it.

2. A method for treatment of organic matter to preserve the principal ingredients thereof when said matter is desiccated, which consists in subjecting the organic matter suddenly to a temperature considerably below its freezing point, pulverizing the frozen matter, then sterilizing it while frozen.

3. A method for treatment of organic matter to preserve the principal ingredients thereof when said matter is desiccated, which consists in subjecting the organic matter to a temperature so low that the said organic matter will become solid and may be easily pulverized without occurrence of fermentation or other chemical action, and then pulverizing and sterilizing the organic matter while still maintaining it in frozen condition and under the influence of the low temperature.

4. A method for treatment of organic matter to preserve the principal ingredients thereof when said matter is desiccated, which consists in subjecting the organic matter to a rapid intense cooling to a state of congelation, reducing it while congealed to powder, and sterilizing the powder while still in the state of congelation.

5. A method for treatment of organic matter to preserve the principal ingredients thereof when said matter is desiccated, which consists in first quick-freezing the organic matter, pulverizing it while in a frozen condition, and finally drying the frozen powder under a vacuum and at a temperature below zero.

6. A method for treatment of organic matter to preserve the principal ingredients thereof when said matter is desiccated, which consists in first freezing the organic matter, pulverizing it while in a frozen condition, and finally substantially drying the frozen powder at a temperature below its freezing point.

7. A method for treatment of organic matter to preserve and extract the active principles thereof, which consists in first congealing the organic matter, then pulverizing it while frozen, and then extracting the active principals from the pulverized frozen matter at a temperature below the melting point of the matter.

8. A method for treatment of organic matter containing an oil, which consists in quick freezing the organic matter, pulverizing it while frozen, dissolving out the oil from the pulverized frozen matter by a liquid neutral hydrocarbon at a temperature below the melting point of the matter, and finally separating the oil and said hydrocarbon.

9. A method for treatment of organic matter containing an oil, which consists in quick freezing the organic matter, pulverizing it while frozen, bringing a liquid solvent into contact with the frozen powder in a closed vessel under pressure to effect lixiviation at a temperature below the melting point of the matter, and finally evaporating the solvent from the mixture containing the oil.

10. The method of treating organic matter containing essential oils, which consists in first freezing the organic matter, comminuting the frozen mass, removing the essential oils from the comminuted frozen matter by dissolving it in a low boiling liquid gas at a temperature below the melting point of the organic matter, thereby avoiding tendency to oxidation, and finally separating the essential oils and said solvent.

11. The method of treating organic matter containing an oil, which consists in first freezing the organic matter, then dissolving out the oil from the frozen matter while maintaining it at a temperature below the melting point of said matter by treating it with liquefied methane, and finally recovering the oil from the methane.

Signed at Bordeaux this 13th day of May, 1929.

HENRI LOUIS PAUL TIVAL.